US008983162B2

(12) United States Patent
Ye et al.

(10) Patent No.: US 8,983,162 B2
(45) Date of Patent: Mar. 17, 2015

(54) METHOD AND APPARATUS FOR ESTIMATING MONTE-CARLO SIMULATION GAMMA-RAY SCATTERING IN POSITRON EMISSION TOMOGRAPHY USING GRAPHICS PROCESSING UNIT

(75) Inventors: Jong Chul Ye, Daejeon (KR); Kyung Sang Kim, Daejeon (JP)

(73) Assignee: Korea Advanced Institute of Science and Technology (KR)

( * ) Notice: Subject to any disclaimer, the term of this patent is extended or adjusted under 35 U.S.C. 154(b) by 318 days.

(21) Appl. No.: 13/467,896

(22) Filed: May 9, 2012

(65) Prior Publication Data

US 2012/0288176 A1 Nov. 15, 2012

(30) Foreign Application Priority Data

May 11, 2011 (KR) .......... 10-2011-0043725
Apr. 19, 2012 (KR) .......... 10-2012-0041100

(51) Int. Cl.
*G06K 9/00* (2006.01)
*G06T 11/00* (2006.01)
*A61B 6/00* (2006.01)

(52) U.S. Cl.
CPC ......... *G06T 11/005* (2013.01); *G06T 2211/428* (2013.01)
USPC ............................ 382/131; 382/128; 382/132

(58) Field of Classification Search
CPC .................. G06T 7/0012; G06T 1/20; G06T 2207/10081; G06T 2207/10104; G06T 2207/10108; G06T 2010/52; A61B 6/52; A61B 6/5258; A61B 6/5282; A61B 6/037; G01T 1/2985

USPC .......................................... 382/131, 128, 132
See application file for complete search history.

(56) References Cited

U.S. PATENT DOCUMENTS

| 5,903,008 | A | * | 5/1999 | Li | 250/363.04 |
| 6,590,213 | B2 | * | 7/2003 | Wollenweber | 250/363.03 |
| 7,180,074 | B1 | * | 2/2007 | Crosetto | 250/370.09 |
| 2005/0072929 | A1 | * | 4/2005 | Chuang et al. | 250/363.03 |
| 2008/0283758 | A1 | * | 11/2008 | Hayden, Jr. et al. | 250/362 |
| 2008/0310580 | A1 | * | 12/2008 | Takahashi et al. | 378/4 |

OTHER PUBLICATIONS

Levin, et al. "A Monte Carlo Correction for the Effect of Compton Scattering in 3-D PET Brain Imaging." IEEE Transactions on Nuclear Science. 42.4 (1995): 1181-1185. Print.*
Kim, et al. "Fast Implementation of Fully Iterative Scatter Corrected OSEM for HRRT using GPU." Nuclear Science Symposium Conference Record (NSS/MIC). (2010): 3330-3332. Print.*

(Continued)

*Primary Examiner* — Michael A Newman
(74) *Attorney, Agent, or Firm* — Hayes Soloway P.C.

(57) ABSTRACT

A method and apparatus for reconstructing an image by generating a scatter-corrected sinogram are provided. In the reconstructed image in which initial scattering is not corrected, an emission position of a photon is determined. A graphics processing unit (GPU) calculates migration of the photon using a Monte-Carlo simulation. A 3-dimensional (3D) line of response (LoR) may be calculated through a position in which the photon reaches a detector. The calculated LoR may be converted into a 3D sinogram form and stored in a prompt sinogram and a scatter-corrected sinogram. A final scatter-corrected sinogram may be generated by adjusting a scale of the scatter-corrected sinogram.

17 Claims, 9 Drawing Sheets

(56) References Cited

OTHER PUBLICATIONS

Alessio, et al. "PET Image Reconstruction." Nuclear Medicine 2nd ed. (2006): 1-22. Print.*

Holdsworth, et al. "Performance Analysis of an Improved 3D PET Monte Carlo Simulation and Scatter Correction." IEEE proceedings of: Nuclear Science Symposium Conference. 2. (2001): 13-53-13-57. Print.*

Wang, et al. "Acceleration of PET Monte Carle Simulation using the graphics hardware ray-tracing engine." Nuclear Science Symposium Conference Record (NSS/MIC). (2010): 1848-1855. Print.*

Zaidi, et al. "An Object-Oriented Monte Carlo Simulator for 3D Cylindrical Positron Tomographs." Computer Methods and Methods in Biomedicine. 58. (1999): 133-145. Print.*

Olcott, et al. "GRAY: High Energy Photon Ray Tracer for PET Applications." IEEE Nuclear Science Symposium Conference Record. (2006): 2011-2015. Print.*

Watson, et al. "A Single Scatter Simulation Technique for Scatter Correction in 3D PET." Three-dimensional Image Reconstruction and Nuclear Medicine. (1996): 255-268. Print.*

Daube-Witherspoon, et al. "Treatment of Axial Data in Three-Dimensional PET." J Nucl Med. 28. (1987): 1717-1724. Print.*

Herraiz, et al. "GPU Acceleration of a Fully 3D Iterative Reconstruction Software for PET using CUDA." IEEE Nuclear Science Symposium Conference Record. (2009): 4064-4067. Print.*

* cited by examiner

METHOD AND APPARATUS FOR ESTIMATING MONTE-CARLO SIMULATION GAMMA-RAY SCATTERING IN POSITRON EMISSION TOMOGRAPHY USING GRAPHICS PROCESSING UNIT

CROSS-REFERENCE TO RELATED APPLICATIONS

This application claims the benefit of Korean Patent Application No. 10-2011-0043725 and of Korean Patent Application No. 10-2012-0041100, respectively filed on May 11, 2011 and Apr. 19, 2012, in the Korean Intellectual Property Office, the disclosures of which are incorporated herein by reference.

BACKGROUND

1. Field of the Invention

Following embodiments relate to a positron emission tomography (PET). A method and apparatus for processing a Monte-Carlo simulation in parallel using a graphics processing unit (GPU) for gamma-ray scatter estimation are disclosed.

2. Description of the Related Art

Tomography refers to an imaging method for non-invasively observing a specific cross section of an object without causing an overlap with another adjacent cross section by rotating a detector by about 180° or about 360°.

A sinogram refers to a plurality of images obtained through the tomography. The sinogram is reconstructed into a 3-dimensional (3D) image. An observer may observe a specific cross section of an imaged object through the reconstructed 3D image.

A tomographic image in nuclear medicine refers to an image expressing distribution characteristics of radioactive medicine given into an object person and distributed according to biochemical characteristics.

A level of radiation of the radioactive medicine to be given into a body is restricted in accordance with the corresponding standard. Therefore, a high-definition image may be difficult to be reconstructed from an observed value recorded by a small amount of photons.

When a tomogram is photographed using a nuclear medicine imaging device, while strength of an observed signal is low, a noise level may be relatively high.

Therefore, scattering of gamma rays may greatly affect an image reconstruction result. To compensate for an image noise induced by the gamma-ray scattering, an approximated gamma-ray scatter estimation algorithm such as single scattering simulation is widely used.

Monte-Carlo simulation generates a gamma-ray photon one by one and simulates of gamma-ray photon migrations to be similar to the real.

Monte-Carlo simulation may be the standard for researchers to predict and estimate feasible phenomena. However, Monte-Carlo simulation is seldom used in actual clinics since at least several hours to several days of operation time are required for Monte-Carlo simulation. For the same reason, estimation and correction of gamma-ray scattering using Monte-Carlo simulation is seldom used for researches.

Estimation of gamma-ray scattering and final reconstruction of a 3D image may take most of the entire operation time.

A parallel processing may be adopted to reduce the operation time. According to the parallel processing, works may be divided into the same types and operations are performed simultaneously by a plurality of computation cores.

A central processing unit (CPU) or graphics processing unit (GPU) equipped with a multicore may be used for the parallel processing. Specifically, the GPU may perform large-scale parallel processing by including hundreds to thousands of cores in general. The GPU may perform not only a graphic operation but also a mathematical operation.

SUMMARY

In one aspect, present invention provides a method and apparatus to increase speed by hundreds of times or more by employing a graphics processing unit (GPU) for estimating gamma-ray scattering using Monte-Carlo simulation which is known to be the most accurate.

In another aspect, the present invention provides a method and apparatus for estimating gamma-ray scattering using a Monte-Carlo simulation to achieve for a clinical use.

In another aspect, the present invention provides a method and apparatus for generating a gamma-ray scatter sinogram using a hybrid central processing unit (CPU)-GPU structure.

In another aspect, the present invention provides an image reconstruction method including receiving an actual sinogram generated by measuring emissions in an object; performing a Monte-Carlo simulation with emission positions in which gamma-rays are generated in an object, and conducted in parallel per emission position of photons using a GPU; generating a scatter-corrected sinogram by subtracting the gamma-ray scatter sinogram from the actually measured sinogram in which gamma-ray scattering is corrected based on information related to scattered photons estimated by the Monte-Carlo simulation; and generating a reconstructed image based on the scatter-corrected sinogram.

In another aspect, the present invention provides a generation method of the gamma-ray scatter sinogram including determining an emission position of a photon in a reconstructed image; calculating migration of two photons generated in the emission position using the Monte-Carlo simulation; calculating positions of two detectors, that is, coordinates of the two detectors of when the two photons respectively reach the two detectors, and values changed during the migration, that is, the values changed as the two photons respectively pass through an object and migrate; calculating a 3-dimensional (3D) line of response (LoR) connecting the positions of the two detectors; generating a prompt sinogram and a gamma-ray scatter sinogram based on the 3D LoR; and adjusting a scale of the gamma-ray scatter sinogram; and generating a scatter-corrected sinogram by subtracting the gamma-ray scatter sinogram from the actually measured sinogram.

The emission position may be plural.

Each of the plurality of emission positions may be allocated to one core among a plurality of cores of a GPU.

The calculating the migration of the two photons and the calculating the positions of the two detectors and the values changed during the migration may be performed in parallel by the plurality of cores.

The determining the emission position may include regarding positions having the same values in the reconstructed image as the plurality of emission positions; and generating a table includes the plurality of emission positions.

Each of the plurality of cores of the GPU may be allocated with at least one emission position determined by core numbers defined in the table.

The calculating the migration of the two photons may include allocating the emission position to a core of a GPU; randomly generating an emission migration direction by each core; randomly generating a migration distance of the photon by each core; calculating a position after migration by the migration distance; calculating the attenuation of the photon according to the migration; and confirming arrival of the photon to a detector of the two detectors.

The calculating the attenuation of the photon may include obtaining a value corresponding to a 3D coordinate of the migration position from a 3D image of an attenuation coefficient by the core; and reading a value corresponding to the 3D coordinate by the core using a 3D linear interpolation provided by the GPU.

The calculating of the migration of the two photons may further include determining occurrence of scattering of the photon at the migration position by the core; randomly generating an angle of the scattering by the core when the scattering occurs; and calculating a Compton scattering value by the core when the scattering occurs.

The determining of occurrence of the scattering may include determining by the core that the scattering does not occur when an attenuation coefficient of the migration position is less than or equal to a threshold value and that the scattering occurs when the attenuation coefficient is greater than the threshold value.

The generation of the prompt sinogram and the gamma-ray scatter sinogram may include the rebinning of the 3D LoR into a sinogram form; storing the sinogram form rebinned from the 3D LoR in the prompt sinogram; and storing the sinogram form rebinned from the 3D LoR in the gamma-ray scatter sinogram when at least one photon of two photons is scattered.

The rebinning of the 3D LoR into the sinogram form may include dividing the 3D LoR into an X-Y direction vector and a Z direction vector; and converting the 3D LoR into the sinogram form based on the X-Y direction vector and the Z direction vector.

The adjusting of the scale of the gamma-ray scatter sinogram may include calculating a scale constant that minimizes an error between an actually measured sinogram and the prompt sinogram; and multiplying the scale constant by the gamma-ray scatter sinogram.

In another aspect, the present invention provides an image reconstruction apparatus including a receiving unit to receive an actual sinogram generated by measuring an object; a GPU to generate a reconstructed image using the actual sinogram; and a GPU to perform a Monte-Carlo simulation with respect to emission positions in which gamma-rays are generated in the object. Monte-Carlo simulation may perform in parallel per emission position of photons, wherein the CPU generates a scatter-corrected sinogram by subtracting the gamma-ray scatter sinogram from the actually measured sinogram in which gamma-ray scattering is corrected based on information related to scattered photons estimated by the Monte-Carlo simulation, and generates a reconstructed image based on the scatter-corrected sinogram in which the gamma-ray scattering is corrected.

In another aspect, the present invention provides a gamma-ray scatter sinogram generation apparatus including a CPU to determine an emission position of a photon in a reconstructed image, calculate a 3D LoR connecting positions of two detectors, generate a prompt sinogram and a gamma-ray scatter sinogram based on the 3D LoR, and adjust a scale of the gamma-ray scatter sinogram; and a GPU to calculate migration of two photons generated in the emission position using a Monte-Carlo simulation and to calculate positions of two detectors, that is, coordinates of the two detectors of when the two photons respectively reach the two detectors, and values changed during the migration, that is, the values changed as the two photons respectively pass through an object and migrate.

In another aspect, the present invention provides a sinogram rebinning method including determining an emission position of a photon in a reconstructed image by a CPU; generating, by a GPU, information on a 3D LoR connecting positions of two detectors related to a photon pair generated in the emission position using a Monte-Carlo simulation, the positions of the two detectors referring to detector coordinates of when the two photons of the photon pair respectively reach the two detectors; and performing sinogram rebinning based on the information on the 3D LoR, wherein the emission position may be plural, the GPU may allocate each of the plurality of emission positions to a plurality of threads of the GPU, respectively, and the generating of the information on the 3D LoR and the performing of the sinogram rebinning may be performed in parallel respectively by the CPU and the GPU.

The plurality of emission positions may be divided into a plurality of groups.

Each of the plurality of groups may be processed through iterations of the generating of the information of the 3 LoR and the performing of the sinogram rebinning.

The information on the 3D LoR may be transmitted from the GPU to the CPU by asynchronous memory transfer.

In another aspect, the present invention provides a sinogram generation apparatus including a CPU to perform sinogram rebinning based on information on a 3D LoR that determines an emission position of a photon in a reconstructed image; and a GPU to generate information on the 3D LoR connecting positions of two detectors related to a photon pair generated in the emission position using Monte-Carlo simulation, wherein the positions of the two detectors may refer to detector coordinates of when the two photons of the photon pair respectively reach the two detectors, the emission position may be plural, the GPU may allocate each of the plurality of emission positions to a plurality of threads of the GPU, respectively, and the generating of the information on the 3D LoR and the performing of the sinogram rebinning may be performed in parallel respectively by the CPU and the GPU.

EFFECT

In a preferred embodiment, the present invention provides a method and apparatus for estimating gamma-ray scattering with a reduced operation time through parallel processing.

Additionally, in another preferred embodiment, the present invention provides a method and apparatus for calculating a Monte-Carlo simulation through parallel processing by a graphics processing unit (GPU).

Additionally, in another preferred embodiment, the present invention provides a method and apparatus for generating a gamma-ray scatter sinogram using a hybrid central processing unit (CPU)-GPU structure.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
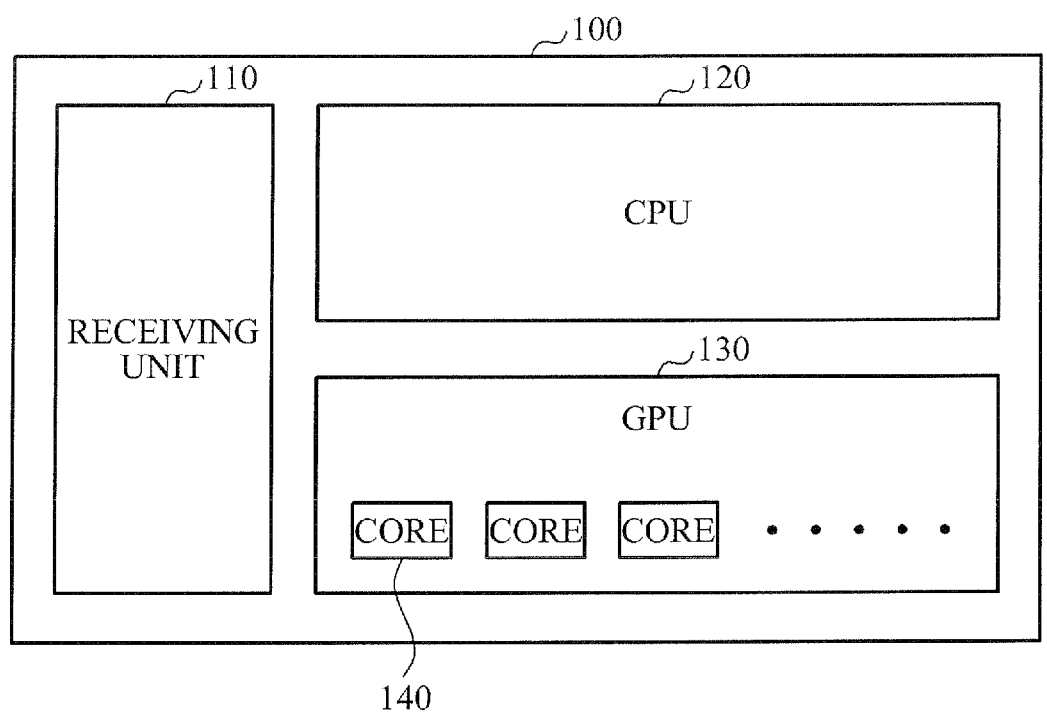
FIG. 1 is a diagram illustrating an image reconstruction apparatus using a gamma-ray scatter sinogram, according to an embodiment of the present invention.

Reference will now be made in detail to exemplary embodiments of the present invention, examples of which are illustrated in the accompanying drawings, wherein like reference numerals refer to the like elements throughout. However, the present invention is not limited by the exemplary embodiments.

FIG. 1 illustrates an image reconstruction apparatus 100 using a gamma-ray scatter sinogram, according to an embodiment of the present invention.

The image reconstruction apparatus 100 may include a receiving unit 110, a central processing unit (CPU) 120, and a graphics processing unit (GPU). The image reconstruction apparatus 100 may be a sinogram generation apparatus that generates a scatter-corrected sinogram.

The receiving unit 110 may receive data indicating a sinogram actually measured through a wired or wireless network.

The GPU 130 may include at least one core 140. The at least one core 140 may perform graphic operation in parallel.

The GPU 130 may perform an operation of a Monte-Carlo simulation which calculates migration of a photon.

Each of the at least one core 140 may calculate migration, that is, a migration path, of a gamma-ray photon pair generated in at least one emission position.

The migration of the photon pair may include scattering. A status value of a photon may include information on whether the photon is scattered or not.

When scattering occurs, a scattering angle and a migration distance of the photon may be randomly determined.

When photons reach a detector, the operation may be ended.

The GPU 130 may be included in the CPU 120.

The CPU 120 may generate a prompt sinogram and a gamma-ray scatter sinogram using a detector coordinate obtained through the Monte-Carlo simulation.

The prompt sinogram includes all data whereas the gamma-ray scatter sinogram includes data only related to gamma-ray scattering.

The CPU 120 may calculate a scale constant that minimizes an error by comparing the actually measured sinogram and the prompt sinogram. In addition, the CPU 120 may obtain a final gamma-ray scatter sinogram by multiplying the scale constant by the gamma-ray scatter sinogram.

The image reconstruction apparatus 100 may reconstruct an image using the scatter-corrected sinogram.

Also, the scatter-corrected sinogram may be generated by the CPU 120 and the GPU 130. Therefore, the CPU 120 and the GPU 130 may construct a scatter-corrected sinogram generation apparatus.

Figure 2:
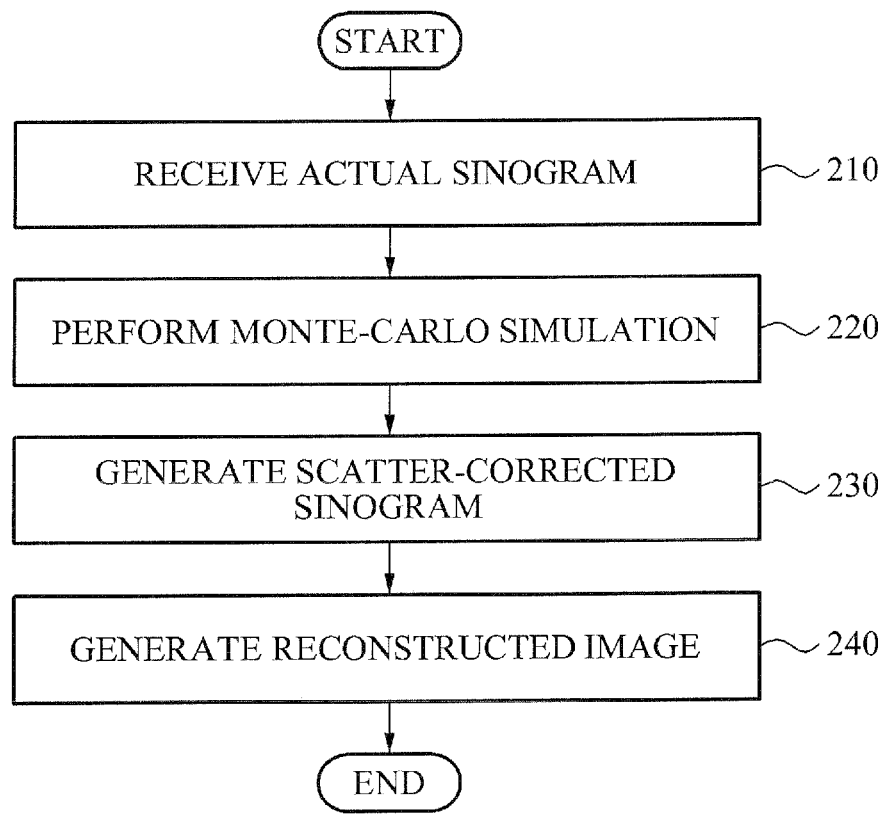
FIG. 2 is a flowchart illustrating an image reconstruction method using a scatter-corrected sinogram, according to an embodiment of the present invention.

FIG. 2 is a flowchart illustrating an image reconstruction method using a scatter-corrected sinogram, according to an embodiment of the present invention.

The present embodiment may be implemented by the image reconstruction apparatus 100. That is, the image reconstruction apparatus 100 including a GPU may reconstruct an image using the scatter-corrected sinogram.

The image being reconstructed may be a 3-dimensional (3D) image.

In operation 210, a sinogram for reconstructing the image may be received, for example, by the receiving unit 110.

The received sinogram may be an actual sinogram generated by measuring an object by an actual machine, that is, a positron emission tomography (PET) device.

Received data may be data transmitted from the PET device. Alternatively, the received data may be data transmitted from a server for providing data.

Using the actual sinogram, the CPU 120 may generate a reconstructed image in which scattering is not corrected. The object may be recognized based on the reconstructed image.

In operation 220, a Monte-Carlo simulation may be performed with respect to emission positions in which gamma-rays are generated in the object, for example by the GPU 130.

The emission positions may refer to positions within the reconstructed image in which the scattering is not corrected. That is, for example, the emission positions of the gamma-rays in the reconstructed image, in which the scattering is not corrected, may be determined by the CPU 120.

The Monte-Carlo simulation generates a virtual photon and randomly moves the virtual photon in a similar manner to the real. That is, the Monte-Carlo simulation models migration of an actual photon.

The Monte-Carlo simulation may be implemented by parallel processing in the GPU 130. That is, the Monte-Carlo simulation may be performed by the GPU 130 in parallel per the emission position of the photons.

The parallel processing may be achieved by a parallel processing code.

Even with respect to parallel processing codes implementing the same algorithm, operation speeds of the respective parallel processing codes are different according to complexity.

Therefore, the parallel processing code needs to be simplified by using a small number of variables.

For example, in a case in which a CPU, such as the CPU 120, in the image reconstruction apparatus 100 performing the Monte-Carlo simulation participates only in input and output of files while actual operations for the Monte-Carlo simulation is performed in parallel by a parallel processing apparatus such as the GPU 130, the parallel processing code performed in the parallel processing apparatus needs to be configured as simply as possible.

To increase the operation speed of the parallel processing code which is essential in the parallel processing, first of all, frequency of data transmission needs to be reduced. Generally, several nanoseconds may be required for one operation. However, an operation for reading or writing with respect to a memory may take hundreds of nanoseconds or more.

When received data is generated from a PET device, a sinogram necessary for reconstruction of an image may be received only once before the operation begins. In addition, the reconstructed image may be received only once after the operation is completed.

Operation 220 will be described in further detail with reference to FIG. 3.

In operation 230, the gamma-ray scatter sinogram may be generated, for example, by the CPU 120.

The gamma-ray scatter sinogram refers to a sinogram in which the gamma-ray scattering is corrected.

The gamma-ray scatter sinogram may be generated based on information on a scattered photon generated by the Monte-Carlo simulation. That is, the CPU 120 may obtain the information on the scattered photon and generate the gamma-ray scatter sinogram using the obtained information.

Scale adjustment may be required in operation 230. The scale adjustment will be described in detail with reference to FIG. 4.

In operation 240, for example, the GPU 130 may generate the reconstructed image in which the scattering is corrected based on the gamma-ray scatter sinogram.

Figure 3:
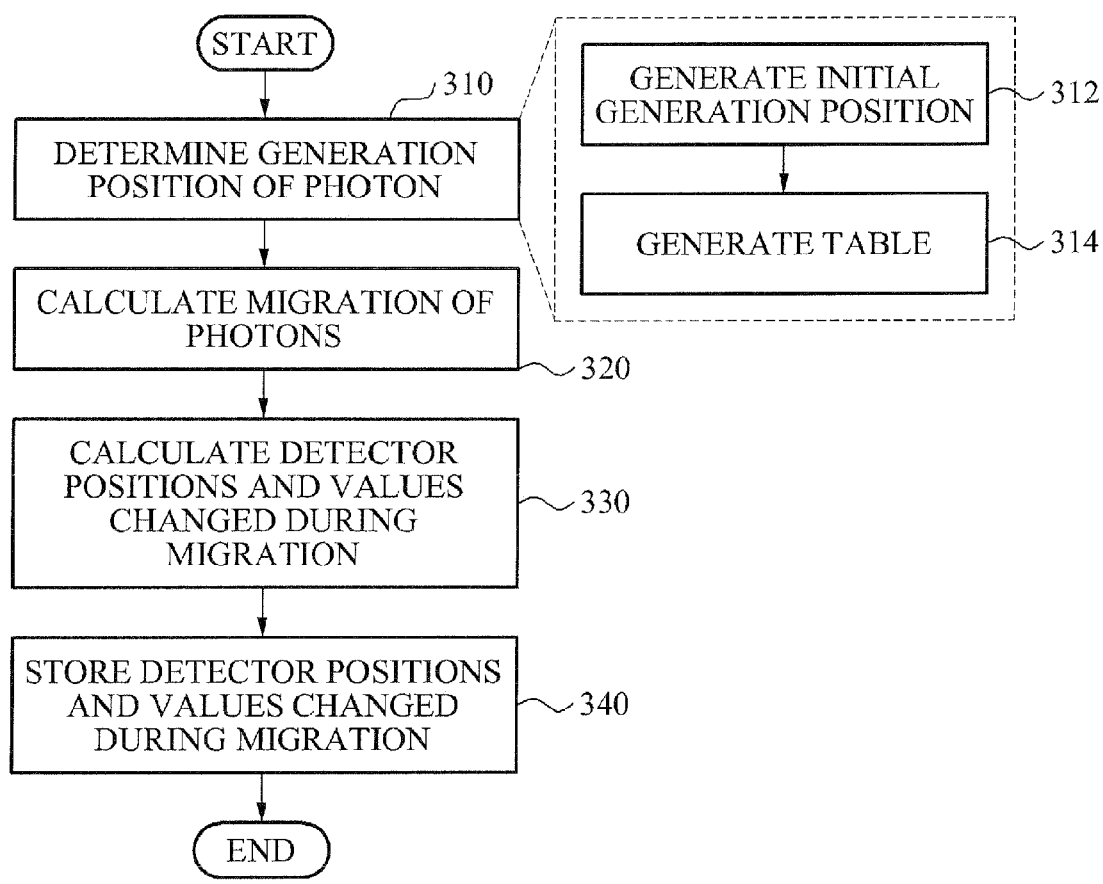
FIG. 3 is a flowchart illustrating a Monte-Carlo simulation according to an embodiment of the present invention.

FIG. 3 is a flowchart illustrating a Monte-Carlo simulation according to an embodiment of the present invention.

Operations 310 through 340 may be included in operation 220 described in the previous embodiment.

In operation 310, an emission position of a photon in a reconstruct image may be determined, for example, by a CPU 120.

The emission position may be plural.

The reconstructed image may refer to a reconstructed image in which the scattering described with reference to FIG. 2 is not corrected.

Operation 310 may include operations 312 and 314.

In operation 312, for example, the CPU 120 may generate positions having values in the reconstructed image as emission positions of the photons.

The emission positions may be positions in which gamma-rays are generated. The photons may be gamma-ray photons.

In operation 314, for example, the CPU 120 may collect only the emission positions and thereby generate a table including a plurality of the emission positions. The table may reflect an amount of the gamma-ray, that is, a number of the emission positions.

A plurality of cores 140 of a GPU 130 may collectively read different positions, respectively, from the table generated according to core numbers of the plurality of cores 140. That is, each of the plurality of cores 140 of the GPU 130 is allocated with at least one emission position among the plurality of emission positions defined in the table.

That is, each of the plurality of emission positions may be allocated to one of the plurality of cores 140. Here, the at least one emission position allocated to each core 140 may be determined based on the core number of the core 140.

Each of the emission positions may be read out sequentially and alternately, irrespective of a number of the plurality of cores 140 included in the GPU 130. For example, the number of the emission positions is 60 and the number of the plurality of cores 140 of the GPU 130 is 30, each of the plurality of cores 140 may be allocated with two emission positions.

The plurality of cores 140 of the GPU 130 may perform an operation related to the at least one emission position allocated to each core 140, for example operations 320 and 330, in parallel.

In operation 320, for example, the plurality of cores 140 of the GPU 130 may calculate migration of two photons generated from the emission positions using the Monte-Carlo simulation.

Operation 320 will be described in detail with reference to FIG. 6.

In operation 330, for example, the plurality of cores 140 of the GPU 130 may calculate positions of two detectors and values changed during the migration.

The positions of the two detectors may be detector coordinates of when the two photons respectively reach the two detectors.

The values changed during the migration may be values changed as the two photons respectively pass through an object and migrate.

When PET is used, a gamma-ray pair may be generated. Accordingly, the detector coordinates of when the two photons of the gamma-ray pair respectively reach the two detectors are necessitated.

A line of response (LoR) may be calculated using the detector coordinates and accordingly a sinogram may be obtained.

During one unit operation, therefore, each of the plurality of cores 140 may be in charge of one emission position and output final positions of the two detectors through a physical operation with respect to the gamma-ray photon pair generated from the emission positions of the gamma-rays. Here, each of the plurality of cores 140 may also output the values changed as the gamma-ray photon pair pass through the object such as a measured object and migrate.

In operation 340, the positions of the two detectors and the values changed during the migration may be stored, for example, by the plurality of cores 140.

The plurality of cores 140 may transmit the positions of the two detectors and the values changed during the migration to the CPU 120.

Figure 4:
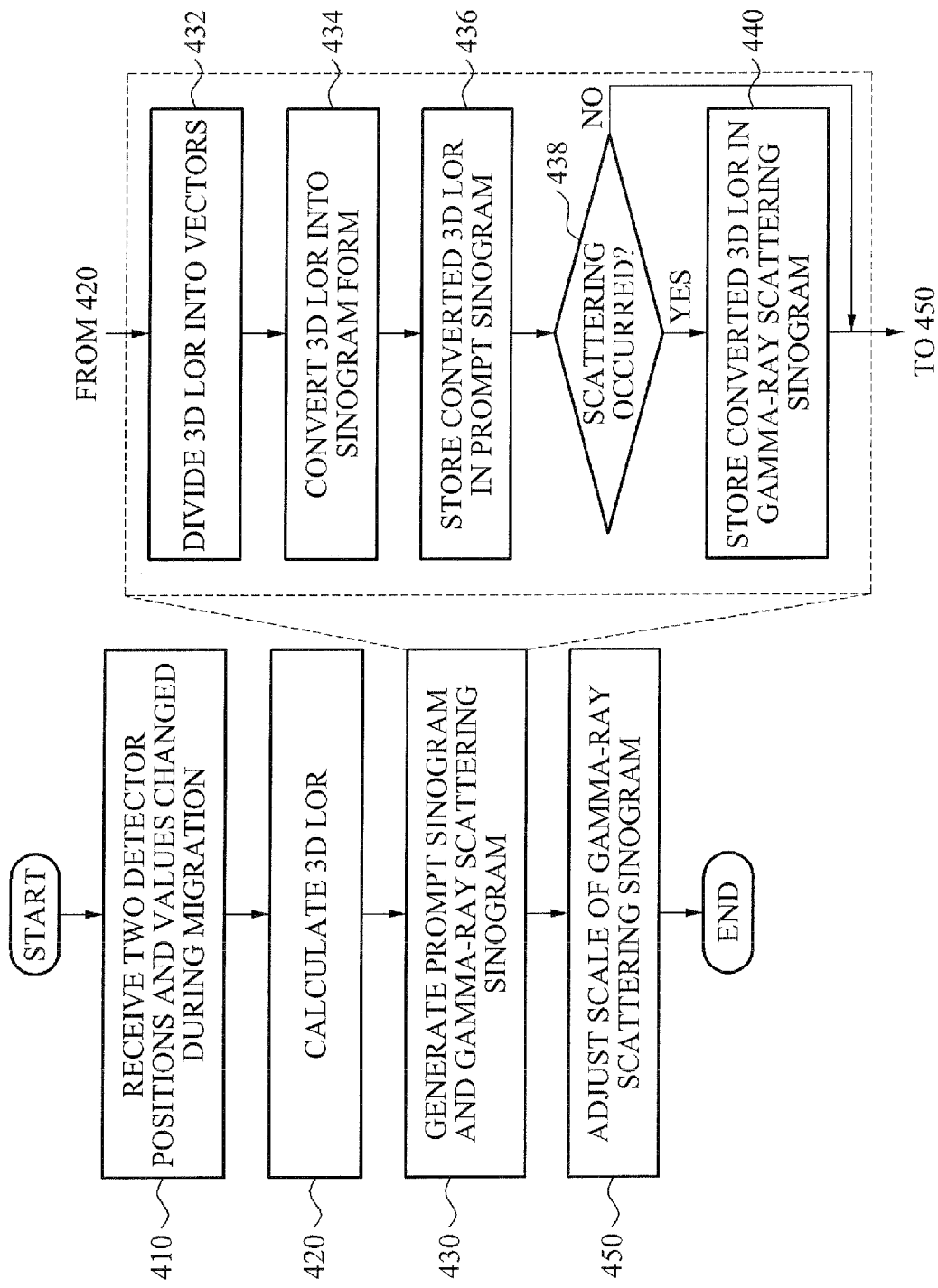
FIG. 4 is a flowchart illustrating a sinogram generation method according to an embodiment of the present invention.

FIG. 4 is a flowchart illustrating a sinogram generation method according to an embodiment of the present invention.

Operations 410 to 450 may be included in operation 230 described in the previous embodiment.

In operation 410, positions of the detectors, to which two photons respectively reach, and values changed during migration may be received, for example, by a CPU 120.

In operation 420, a 3D LoR connecting two detector coordinates or an equation of the 3D LoR may be calculated, for example, by the CPU 120.

In operation 430, a prompt sinogram and a gamma-ray scatter sinogram may be generated based on the 3D LoR, for example, by the CPU 120.

Operation 430 may include following operations 432, 434, 436, 438, and 440.

In operations 432 and 434, the generated 3D LoR may be converted into a sinogram form, for example, by the CPU 120.

In operation 432, the generated 3D LoR may be divided into an X-Y direction vector and a Z direction vector, for example, by the CPU 120.

In operation 434, the 3D LoR may be rebinned into the sinogram form based on the vectors, for example, by the CPU 120.

In operation 436, the 3D LoR converted into the sinogram form may be stored in the prompt sinogram, for example, by the CPU 120. The 3D LoR may be stored in the prompt sinogram using a sinogram coordinate corresponding to the 3D LoR.

The prompt sinogram may include all LoRs in which scattering is included. Therefore, prompt sinogram may be regarded as the same type of data as an actually measured sinogram obtained by a machine such as an PET device. Using such characteristics, a scale adjustment constant may be calculated through comparison between the prompt sinogram obtained through the Monte-Carlo simulation and the actually measured sinogram. A method for calculating the scale adjustment constant will be described specifically with reference to FIG. 5.

In operation 438, for example, the CPU 120 may confirm whether scattering occurs during migration of the two photons.

The two photons each have a state value. The state value may include information on whether the photon is scattered or not. Therefore, the CPU 120 may recognize whether the scattering occurs through the state value.

When the scattering occurs, the 3D LoR converted into the sinogram form may be stored in the gamma-ray scatter sinogram, for example, by the CPU 120 in operation 440.

The gamma-ray scatter sinogram is necessary for estimation of the gamma-ray scattering. Therefore, a scatter sinogram is separately stored in the present embodiment.

In operation 450, a scale of the gamma-ray scatter sinogram may be adjusted, for example, by the CPU 120.

Operation 450 will be described in detail with reference to FIG. 5.

Figure 5:
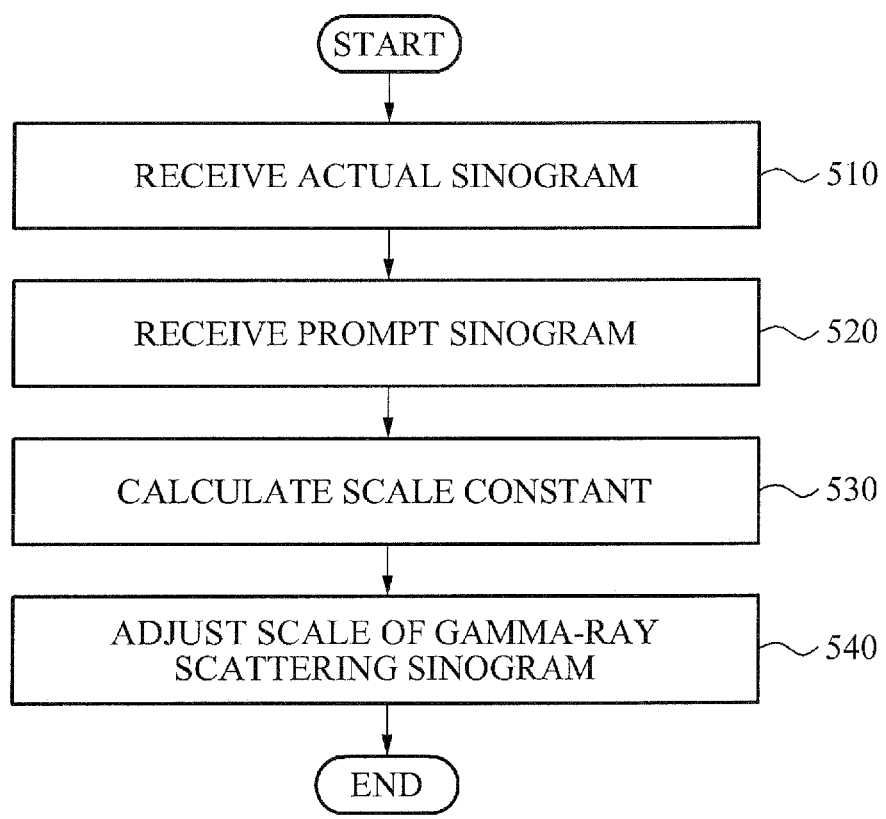
FIG. 5 is a flowchart illustrating a scale adjusting method of a gamma-ray scatter sinogram, according to an embodiment of the present invention.

In operation 460, a scatter-corrected sinogram may be generated by subtracting the gamma-ray scatter sinogram from the actually measured sinogram FIG. 5 is a flowchart illustrating a scale adjusting method of a gamma-ray scatter sinogram, according to an embodiment of the present invention.

During actual imaging by PET, estimation of an accurate number of photons generated by a machine such as a PET device is impractical. Therefore, the scale of the gamma-ray scatter sinogram may be adjusted by performing a simulation using a sufficient amount of photons, first, and then comparing a simulation result with an actually measured value.

In operation 510, an actually measured sinogram obtained by the machine such as the PET device may be received, for example, by a CPU 110.

In operation 520, a prompt sinogram obtained through a Monte-Carlo simulation may be received, for example, by the CPU 110.

In operation 530, for example, the CPU 110 may calculate a scale constant that minimizes an error between the actual sinogram and the prompt sinogram by comparing the actual sinogram with the prompt sinogram.

The scale constant may be calculated since distribution of the prompt sinogram and distribution of the actual sinogram almost correspond to each other.

Since the actual sinogram is actual data obtained by the machine, scattering is all included in the actual sinogram. Therefore, the actual sinogram may be compared with the prompt sinogram.

In operation 540, for example, the CPU 110 may adjust the scale of the gamma-ray scatter sinogram by multiplying the scale constant.

Through the foregoing operations 510 to 540, the gamma-ray scatter sinogram may have the same scale as the actual sinogram.

Figure 6:
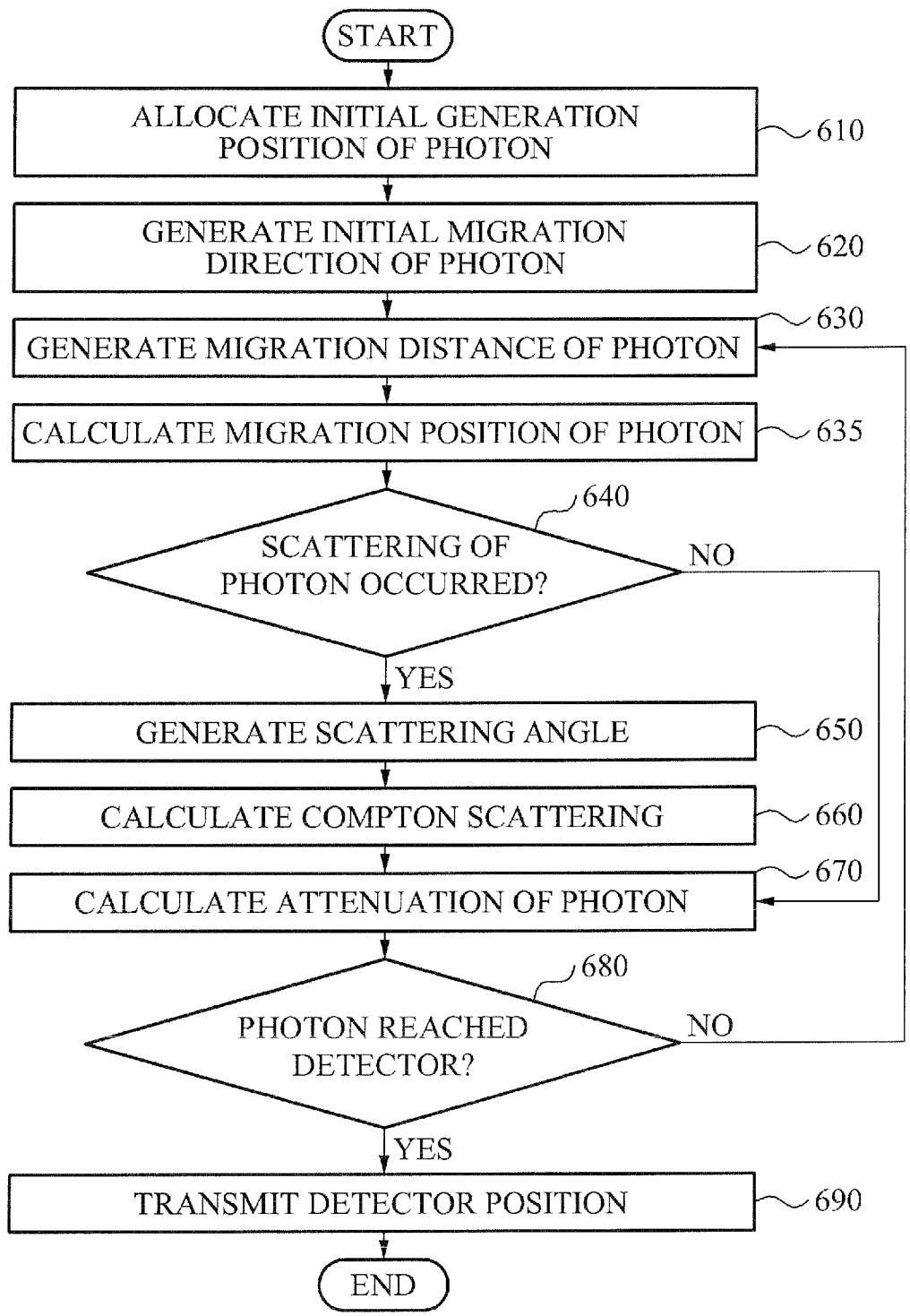
FIG. 6 is a flowchart illustrating an operation method according to migration of photons until the photons reach a detector, according to an embodiment of the present invention.

FIG. 6 is a flowchart illustrating an operation method according to migration of photons until the photons reach a detector, according to an embodiment of the present invention.

The operation according to the migration of the photons may be performed by a GPU 130. each of the plurality of cores of the GPU 130 may calculate a path of two photons, that is, a photon pair, generated in one emission position.

In operation 610, each of the plurality of cores 140 may be allocated with an emission position of a photon.

In operations 620 through 690, each of the plurality of cores 140 may generate an initial path of photons. The initial path refers to a path formed in a random direction from the emission position. Additionally, each of the plurality of cores 140 may generate a path including a random distance and scattering angle, and perform operation while moving the photon along the path.

Random values such as the path in the random direction and the random distance and scattering angle may be generated by a random number generator. The random values may be generated using a random generation function provided by the GPU 130.

In operation 620, each of the plurality of cores 140 may randomly generate an initial migration direction in the allocated generation position of the photon.

In operation 630, each of the plurality of cores 140 may randomly generate a migration distance of the photon. That is, each of the plurality of cores 140 may randomly determine a distance by which the photon is to migrate in the randomly determined migration direction.

In operation 635, each of the plurality of cores 140 may calculate a migration position to which the photon migrates in the initial migration direction by the migration distance.

In operation 640, each of the plurality of cores 140 may determine whether scattering of the photon occurs in the migration position of the photon.

Each of the plurality of cores 140 may determine that the scattering does not occur when an attenuation coefficient of the migration position of the photon is less than or equal to a threshold value, and that the scattering occurs when the attenuation coefficient is greater than the threshold value.

The attenuation coefficient may be obtained through a 3D image of the attenuation coefficient, which is photographed by a PET device.

When the scattering occurs, operations 650 and 660 are performed. When the scattering does not occur, operation 670 is performed.

In operation 650, each of the plurality of cores 140 may randomly generate the scattering angle.

The scattering angle may affect the migration direction of the photon in the following operation.

In operation 660, each of the plurality of cores 140 may calculate a Compton scattering value. That is, each of the plurality of cores 140 may calculate an effect of the Compton scattering.

Each of the plurality of cores 140 may calculate the Compton scattering value using the Klein-Nishina formula.

An equation for calculating the Compton scattering value may reflect energy reduction according to the scattering angle.

In operation 670, each of the plurality of cores 140 may calculate attenuation of the photon according to migration of the photon to the migration position. That is, each of the plurality of cores 140 may sum up attenuation coefficients of an object, which correspond to the path of the photon.

The attenuation of the photon may be calculated through a 3D image of an attenuation coefficient, photographed by the PET device. That is, the attenuation of the photon may be calculated by obtaining a value corresponding to a 3D coordinate of the migration position of the photon in the 3D image.

Here, each of the plurality of cores 140 may read and obtain values corresponding to a 3D coordinate from an 3D object, using a 3D linear interpolation provided by the GPU 130.

To use the 3D linear interpolation, a CPU 120 may connect a gamma-ray emission reconstruction image and an attenuation reconstruction image to a 3D texture memory of the GPU 130. The GPU 130 may provide the 3D linear interpolation during the Monte-Carlo simulation through the connection by the 3D texture memory. Accordingly, speed of attenuation calculation may be greatly increased.

In operation 680, each of the plurality of cores 140 may confirm whether the photon reaches the detector.

In operation 680, each of the plurality of cores 140 may calculate a position of the photon when the photon reaches the detector, by considering a diameter and a number of detector blocks provided by specification of an actually modeled machine.

When the photon does not reach the detector, operation 620 and following operations 630 to 680 may be performed again.

When the photon reaches the detector, operation 690 may be performed.

In operation 690, each of the plurality of cores 140 may transmit the position of the detector of when the photon reaches the detector to the CPU 120. Alternatively, each of the plurality of cores 140 may store the position of the detector of when the photon reaches the detector.

Figure 7:
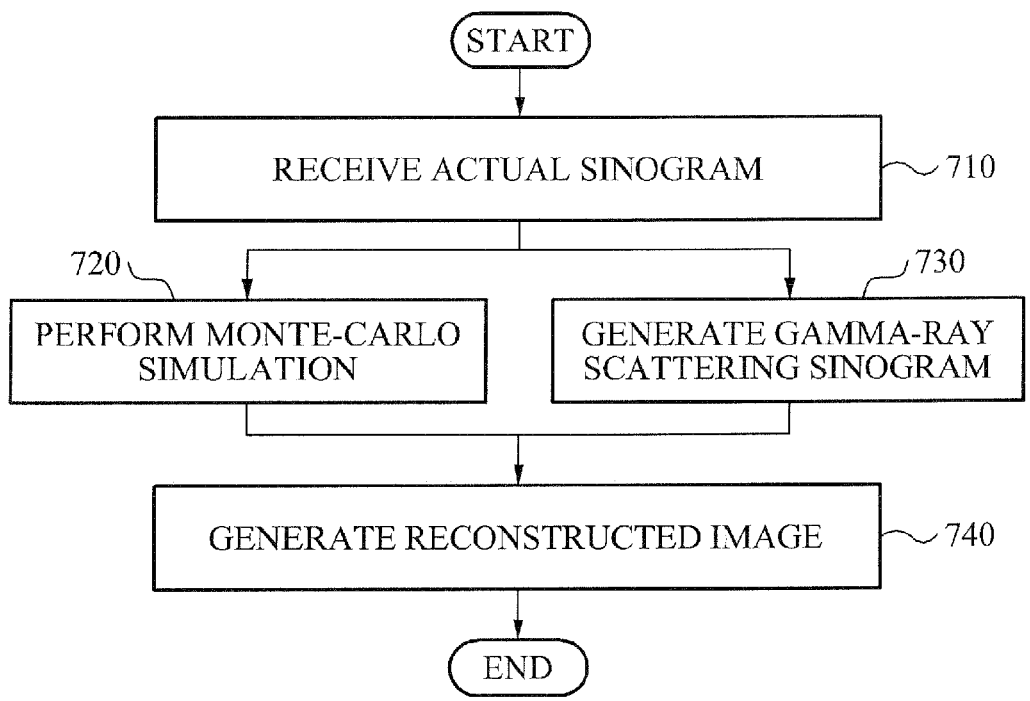
FIG. 7 is a flowchart illustrating an image reconstruction method using a hybrid CPU-GPU implementation, according to an embodiment of the present invention.

FIG. 7 is a flowchart illustrating an image reconstruction method using a hybrid CPU-GPU implementation, according to an embodiment of the present invention.

Operations 710, 720, 730, and 740 may respectively correspond to operations 210, 220, 230, and 240 described with reference to FIG. 2.

Operation 720 may be performed by a CPU 120 and a GPU 130. For example, in operation 720, the CPU 120 may determine an emission position of a photon in a reconstructed image. The GPU 130 may be used for migration of the photon. The GPU 130 may generate information on the 3D LoR which connects two detector positions with respect to a photon pair generated from the generation positions, using a Monte-Carlo simulation. The information on the 3D LoR may include 1) information in relation to the 3D LoR or 2) information on the 3D LoR and information used for sinogram rebinning in relation to a photon pair generated from another emission position.

The detector positions may be detector coordinates of when two photons of the photon pair respectively reach two detectors. Here, the information on the 3D LoR may refer to a coordinate of the 3D LoR.

In operation 730, the CPU 120 may perform sinogram rebinning based on the information on the 3D LoR. The sinogram rebinning refers to generation of at least one of a prompt sinogram and a gamma-ray scatter sinogram based on the information on the 3D LoR obtained in operation 720. Also, the sinogram rebinning may refer to part of processes for the generation.

Operation 720 for generating the information on the 3D LoR and operation 730 for performing the sinogram rebinning may be performed in parallel by the CPU 120 and the GPU 130, respectively. Operation 720 and operation 730 may be allocated to the CPU 120 and the GPU 130, separately. Operation 720 and operation 730 may each perform specific calculation iteratively. A previous iterative calculation result may not influence a next iterative calculation result.

In operation 720, the emission position may be plural. That is, operation 720 and operation 730 may be performed by a plurality of photon pairs having respectively different emission positions. In operation 720, the GPU 130 may allocate the plurality of emission positions respectively to a plurality of threads of the GPU 130. The plurality of threads may be processed by at least one core 140. One thread may process one thread. The at least one core 140 may simultaneously process the plurality of threads.

According to the parallel processing described above, the full resources of the CPU 120 and the GPU 130 may be used and the bottleneck of memory transfer between the CPU 120 and the GPU 130 may be avoided. For the parallel techniques, Open Multi-Processing (OpenMP) may be applied for the CPU 120 while Compute Unified Device Architecture (CUDA) may be applied for the GPU 130.

Figure 8:
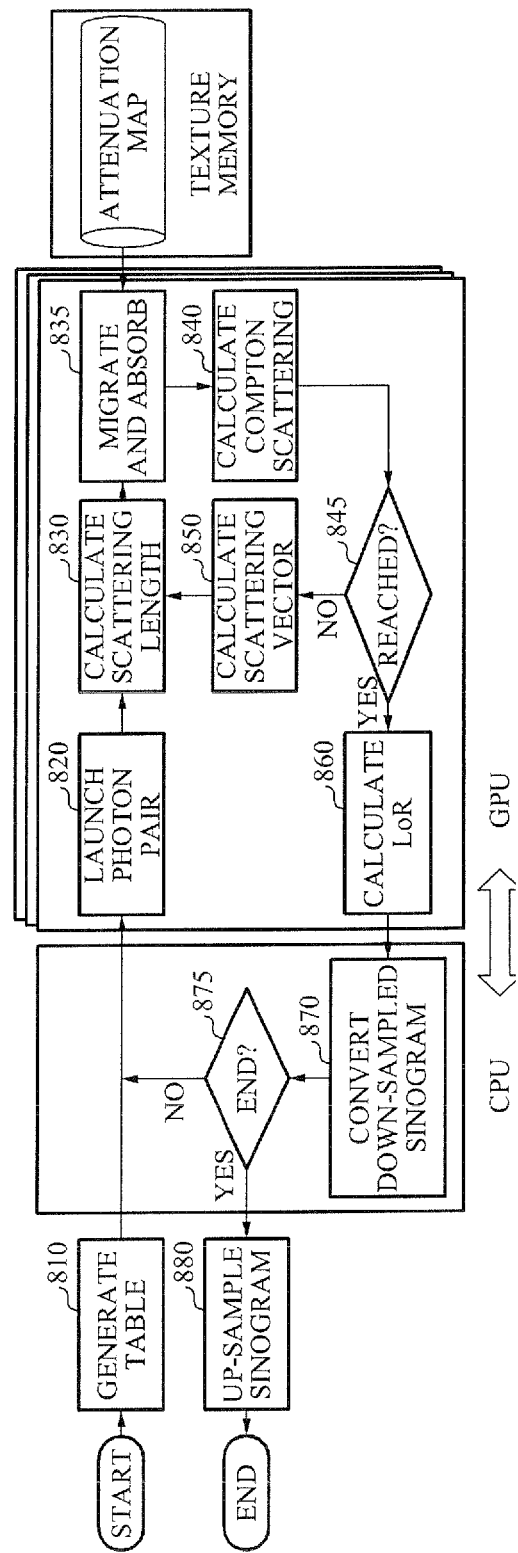
FIG. 8 is an operation flowchart of the hybrid CPU-GPU multiple scatter simulation (MSS) in 3D PET, according to an embodiment of the present invention.

FIG. 8 is an operation flowchart of hybrid CPU-GPU multiple scatter simulation (MSS) in 3D PET, according to an embodiment of the present invention.

A CPU 120 may perform operations 870 and 875. The CPU 120 may also perform operations 810 and 880. A GPU 130 may perform operations 820, 830, 840, 850, and 860. Operations 870, 875, and 880 may correspond to operation 730 described in the previous embodiment. Operations 810, 820, 830, 835, 840, 845, 850 and 860 may correspond to operation 720 described in the previous embodiment. Operation 810 may correspond to operation 710 described in the previous embodiment.

Since all kernels may access a constant memory rapidly, geometry parameters such as radius, voxel and detector size may be stored in the constant memory.

In operation 810, the CPU 120 may generate a table. The table may be an emission coordinate table. The emission coordinate table may include data of emission positions and intensities of the emission positions from a radiotracer image.

When the table is generated, the CPU 120 may generate an emission position of a photon.

In operation 820, the GPU 130 may launch a photon pair. The photon pair may be launched in a direction indicated by a unit vector of direction. Operation 820 may indicate initialization performed by the GPU 130.

The GPU 130 may allocate a thread i of the GPU 130 to each emission position $q_i$. Here, i may be a positive number between 1 and n. n may be a maximum number of threads that may be processed by the GPU 130. That is, the GPU 130 may operate at least one thread each allocated with the emission position.

Allocation of the plurality of threads to the emission positions may correspond to operation 610 described with reference with FIG. 6.

The GPU 130 may define a unit vector $u_0$ in an initial direction by a uniform random number generator (RNG) supported by CUDA. The RNG uses different seeds according to each thread.

Two opposite unit vectors of photon propagation may be calculated as u. Here, $u = k \cdot u_0$ and $k = -1, 1$ may be satisfied.

An emission position p may be defined by Equation 1 as follows.

$$p = q_i \qquad \text{[Equation 1]}$$

Calculation of the two unit vectors may correspond to operation 620 described with reference with FIG. 6.

In operation 830, the GPU 130 may calculate a scattering length of each photon pair. Operation 830 may correspond to operation 630 described with reference with FIG. 6.

The scattering length may refer to a direction path length l which may be calculated based on Equation 2.

$$l = -\ln(\epsilon)/\mu \qquad \text{[Equation 2]}$$

Here, $\mu$ may denote an attenuation coefficient of a material of an object. $\epsilon$ may denote uniform distribution within a range [0, 1]. When $I_A$ denotes a texture memory, $\mu$ of Equation 2 may be replaced by $I_A(p)$.

In operation 835, the GPU 130 may calculate migration and absorption of each of the two photons of the photon pair. Here, the absorption may be photoelectric absorption along a ray.

A line integral along the ray defined in an attenuation image may be calculated using the texture memory of the GPU 130 that provides fast 3D linear interpolation. The GPU 130 may update the positions of the respective photon pairs by calculating the line integral. An attenuation map in the texture memory may represent the attenuation image.

When the photon is located outside of a field of view (FoV), the GPU 130 may stop the line integral.

In operation 840, the GPU 130 may calculate a Compton scattering value using the Klein-Nishina formula. Operation 840 may correspond to operations 640, 650, 660, and 670 described with reference to FIG. 6.

When the photon is still located within the object, the GPU 130 may calculate the Compton scattering value based on the Klein-Nishina formula. Here, the GPU 130 may define a scattering angle θ using a uniform random number within [0, 1].

In addition, the GPU 130 may inspect energy of the photon after the Compton scattering. When energy of the two photons of the photon pair is lower than a low level discriminator (LLD), the GPU 130 may reject the photon pair. The rejection of the photon pair may represent that an operation with respect to the photon pair may be broken and the photon pair may not be used for the sinogram rebinning.

When the energy of the two photons of the photon pair is higher than or equal to the LLD, the GPU 130 may continue operations 830, 835, 840, 845, and 850 by following a propagation path of each of the two photons.

In operation 845, the GPU 130 may check whether the photon pair reaches a detector. Operation 845 may correspond to operation 680 described with reference to FIG. 6.

Here, arrival of the photon pair at the detector may represent that the two photons of the photon pair are located outside the FoV. When the photon pair reaches the detector, the energy of the two photons may be higher to or equal to the LLD.

When the photon pair does not reach the detector, the GPU 130 may calculate a scattering vector in operation 850.

Calculation of the scattering vector may refer to update of a scattering flag and a direction of the unit vector u. A Compton scattering event may be recorded using the scattering flag.

Operation 830 may be repeated after operation 850 is performed.

When the photon pair reaches the photon pair, operation 860 may be performed.

In operation 860, after the photon pair reaches the detector, the GPU 130 may convert two detector positions to an LoR. The GPU 130 may calculate two detector positions and also calculate detector cross-sections. The LoR may be calculated by converting the two detector positions into the LoR.

The aforementioned information on the 3D LoR may include the LoR, the two detector positions, and the detector cross-sections.

In operation 870, the CPU 120 may perform conversion into a down-sampled sinogram. The conversion into the down-sampled sinogram may refer to sinogram rebinning that corresponds to migration of a photon. For the sinogram rebinning, the CPU 120 may use the information calculated in operation 860.

In operation 875, the CPU 120 may check whether the operation is ended. When any photon pair of which migration is to be calculated remains, operation 820 may be performed again. When migrations of all photon pairs are calculated, operation 880 may be performed.

In operation 880, the CPU 120 may up-sample the scatter sinogram.

The CPU may calculate a scaling factor for up-sampling of the scatter sinogram and obtain the scattering sinogram.

After the photon migration calculated by the GPU 130 and the sinogram rebinning by the CPU 120, the CPU 120 may up-sample the sinogram to an initial sinogram size.

The GPU 130 may be used for the up-sampling. For example, for quick up-scaling, high-speed linear interpolation using the texture memory supported by the GPU 130 may be used. Spatial smoothing which uses the texture memory may be computationally efficient thanks to a large virtual detector array.

Finally, the CPU 120 may calculate a least square fitting using the simulated prompt from an MSS, and calculate a measured sinogram for calculating the scaling factor. In addition, the prompt sinogram, rather than the scatter portion of the measurement, may be directly compared.

A code 1 below indicates a pseudo code executed in the CPU 120 for the hybrid CPU-GPU MSS.

[Code 1]

(a) Set OpenMP parameters such as the number of CPU cores.
(b) Set the number of grids, blocks and threads for GPU execution.
(c) Make an emission coordinate table from a radiotracer image.
(d) Bind an attenuation image to a texture memory $I_A$.
(e) Create an event query.
(f) For task $t = 1, ..., t_n$.
    1. Calculate a photon migration using GPU.
    2. Set the event query off.
    3. Asynchronous memory transfer from device to host.
    4. If the status of event query is on, calculate downsampled sinogram rebinning using openMP.
(g) Calculate a scaling factor and obtain a scatter sinogram.
(h) Upsample the scatter sinogram.

A code 2 below indicates a pseudo code executed in the GPU 130 for the hybrid CPU-GPU MSS.

[Code 2]

Figure 9:
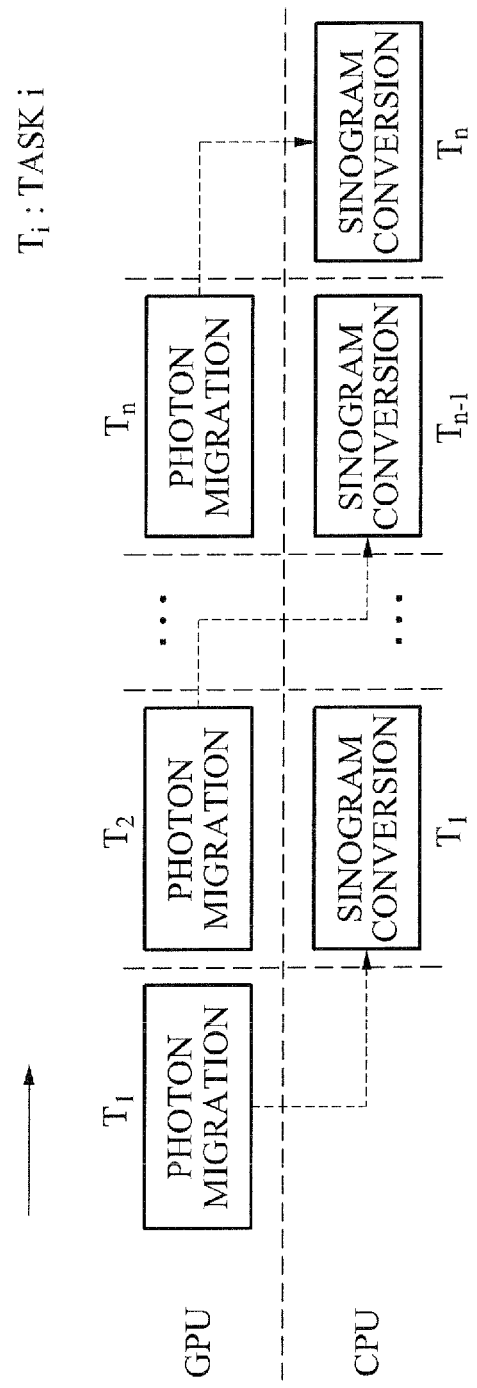
FIG. 9 is a diagram illustrating sequential execution of multiple tasks.

(a) Thread assignment (threadIdx: $i$ = an initial emission position $q_i$).
(b) Calculate an initial vector of direction $u_0$ using the uniform RNG.
(c) For $k = -1, 1$,
    1. Define the direction vector $u = k \cdot u_0$.
    2. Define the emission position $p = q_i$.
    3. While loop (until the photon is rejected or detected)
        (A) Calculated the photon path $l = - \ln(\xi)/I_A(p)$,
           where $\xi$ is an uniform random number [0, 1].
        (B) Calculate the line integral using $I_A$.
        (C) Define cosθ using an uniform random number [0, 1], where θ is the scattering angle.
        (D) Calculate the energy ratio and Compton scattering.
        (E) Update a scatter flag and a direction of unit vector u.
        (F) It the level of energy is lower than the LLD or the photons are located in outside of FoV, break.
(d) If the energy is higher than the LLD,
    1. Calculate two detector positions and detector cross-sections.
    2. Calculate the line of response.
    3. Calculate the number of events FIG. 9 is a diagram illustrating sequential execution of multiple tasks.

Since a total number of threads in a GPU 130 may be limited, not all tasks may be assigned to a single execution.

The tasks for MSS may be divided into at least one task. Each of the at least one task may be sequentially scheduled for calculation of a hybrid CPU 120 and GPU 130.

The GPU 130 and the CPU 120 may sequentially process n-tasks, respectively. Here, n may denote a positive number not less than 1.

To maximally utilize the CPU 120 and the GPU 130, two jobs may be separated. The two jobs may be indicated as a task for performing photon migration and a task for performing sinogram rebinning.

In FIG. 9, n-tasks for photon migration processed by the GPU 130 and n-tasks for sinogram rebinning processed by the CPU 120 are shown. In iteration, the GPU 130 and the CPU 120 may process one task, respectively. A result of task calculation of the GPU 130 in a specific iteration may be used in a task of the CPU 120 in next iteration.

The plurality of emission positions of operation 720 may be classified into a plurality of groups. Each of the plurality of groups may be processed by iterations of operation 720 for generating the information on the 3D LoR and operation 730 for performing the sinogram rebinning. The plurality of groups may be sequentially processed. Each of the tasks may process one group among the plurality of groups.

That is, the plurality of emission positions may be classified into n-groups, and the n-groups may be processed by n+1 times of iterations. Information on 3D LoRs with respect to emission positions processed at k-th iteration may be used for sinogram rebinning at (k+1)-th iteration. Here, k may denote a positive number between 1 and n+1.

For concurrent executions between the CPU 120 and the GPU 130, an event query and asynchronous memory transfer may be considered. The GPU 130 may record events at any points in the program, and query when the events are completed. When a synchronous function is called, a control may wait for completion of the function. However, when an asynchronous function is called, a control may continue regardless of a function completion. Therefore, the asynchronous memory transfer may be used.

Especially, after execution of a GPU task, the asynchronous memory transfer function may be called, and the next task of the GPU 130 may be started regardless of completion of the transfer. The information on the 3D LoR may be transmitted from the GPU 130 to the CPU 120 through the asynchronous memory transfer. The GPU 130 may wait for the transfer completion by checking an event query persistently.

The memory transfer may be completed while the GPU 130 is performing photon migration. The CPU 120 may calculate the corresponding sinogram rebinning using OpenMP.

The aforementioned architecture may maximize the utility of the CPU 120 while significantly improving the overall performance in relation to the gamma-ray scattering simulation.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An image reconstruction method comprising:
receiving an actual sinogram generated by measuring an object;
performing a Monte-Carlo simulation with respect to emission positions in which gamma-rays are generated in the object, the Monte-Carlo simulation performed in parallel per emission position of photons using a graphics processing unit (GPU), wherein the GPU calculates migration of two photons generated in each emission position using the Monte-Carlo simulation and calculates positions of two detectors, that is, coordinates of the two detectors of when the two photons respectively reach the two detectors, and values changed during the migration, that is, the values changed as the two photons respectively pass through an object and migrate;
generating a gamma-ray scatter sinogram in which gamma-ray scattering is corrected based on information related to scattered photons generated by the Monte-Carlo simulation; and
generating a reconstructed image based on the scatter-corrected sinogram.

2. A gamma-ray scatter sinogram generation method comprising:
determining an emission position of a photon in a reconstructed image;
calculating migration of two photons generated in the emission position using a Monte-Carlo simulation;
calculating positions of two detectors, that is, coordinates of the two detectors of when the two photons respectively reach the two detectors, and values changed during the migration, that is, the values changed as the two photons respectively pass through an object and migrate;
calculating a 3-dimensional (3D) line of response (LoR) connecting the positions of the two detectors;
generating a prompt sinogram and a gamma-ray scatter sinogram based on the 3D LoR and
adjusting a scale of the gamma-ray scatter sinogram, and wherein
the emission position is plurl, each of which is allocated to one core among a plurality of cores of a graphics processing unit (GPU), and
the calculating of the mi ration of the two hotons and the calculatin of the ositions of the two detectors and the values changed during the migration are performed in parallel by the plurality of cores.

3. The gamma-ray scatter sinogram generation method of claim 2, wherein the determining of the emission position comprises:
regarding positions having the same values in the reconstructed image as the plurality of emission positions; and generating a table including the plurality of emission positions, and wherein each of the plurality of cores of the GPU is allocated with at least one emission position determined based on core numbers defined in the table.

4. The gamma-ray scatter sinogram generation method of claim 2, wherein the calculating of the migration of the two photons comprises:

randomly generating, by each core, an initial migration direction of each allocated emission position of a photon of the two photons;

randomly generating, by each core, a migration distance of the photon;

calculating, by each core, a migration position to which the photon migrates in the initial migration direction by the migration distance;

calculating, by each core, attenuation of the photon according to the migration to the migration position; and confirming arrival of the photon to a detector of the two detectors.

5. The gamma-ray scatter sinogram generation method of claim 4, wherein the calculating of the attenuation of the photon comprises:

obtaining a value corresponding to a 3D coordinate of the migration position from a 3D image of an attenuation coefficient by each core; and reading a value corresponding to the 3D coordinate by each core using a 3D linear interpolation provided by the GPU.

6. The gamma-ray scatter sinogram generation method of claim 4, wherein the calculating of the migration of the two photons further comprises:

determining occurrence of scattering of the photon at the migration position by each core;

randomly generating an angle of the scattering by each core when the scattering occurs; and calculating a Compton scattering value of the scattering by each core when the scattering occurs.

7. The gamma-ray scatter sinogram generation method of claim 6, wherein the determining of occurrence of the scattering comprises:

determining by each core that the scattering does not occur when an attenuation coefficient of the migration position is less than or equal to a threshold value and that the scattering occurs when the attenuation coefficient is greater than the threshold value.

8. The gamma-ray scatter sinogram generation method of claim 2, wherein the generating of the prompt sinogram and the gamma-ray scatter sinogram comprises:

converting the 3D line of response (LoR) into a sinogram form;

storing the sinogram form converted from the 3D LoR in the prompt sinogram; and storing the sinogram form converted from the 3D LoR in the gamma-ray scatter sinogram when the two photons are scattered photons.

9. The gamma-ray scatter sinogram generation method of claim 8, wherein the converting of the 3D LoR into the sinogram form comprises:

dividing the 3D LoR into an X-Y direction vector and a Z direction vector; and converting the 3D LoR into the sinogram form based on the X-Y direction vector and the Z direction vector.

10. The gamma-ray scatter sinogram generation method of claim 2, wherein the adjusting of the scale of the gamma-ray scatter sinogram comprises:

calculating a scale constant that minimizes an error between an actually measured sinogram and the prompt sinogram; and multiplying the scale constant by the gamma-ray scatter sinogram.

11. An image reconstruction apparatus comprising:

a receiving unit to receive an actual sinogram generated by measuring an object;

a central processing unit (CPU) to generate a reconstructed image using the actual sinogram; and a graphics processing unit (GPU) to perform a Monte-Carlo simulation with respect to emission positions in which gamma-rays are generated in the object, wherein the GPU calculates migration of two photons generated in each emission position using the Monte-Carlo simulation and calculates positions of two detectors, that is, coordinates of the two detectors of when the two photons respectively reach the two detectors, and values changed during the migration, that is, the values changed as the two photons respectively pass through an object and migrate, wherein the Monte-Carlo simulation is performed in parallel per emission position of photons, and wherein the CPU generates a sinogram in which gamma-ray scattering is corrected based on information related to scattered photons generated by the Monte-Carlo simulation, and generates a reconstructed image based on the gamma-ray scatter sinogram in which the gamma-ray scattering is corrected.

12. A gamma-ray scatter sinogram generation apparatus comprising:

a central processing unit (CPU) to determine an emission position of a photon in a reconstructed image, calculate a 3-dimensional (3D) line of response (LoR) connecting positions of two detectors, generate a prompt sinogram and a gamma-ray scatter sinogram based on the 3D LoR, and adjust a scale of the gamma-ray scatter sinogram; and a graphics processing unit (GPU) to calculate migration of two photons generated in the emission position using a Monte-Carlo simulation and to calculate positions of two detectors, that is, coordinates of the two detectors of when the two photons respectively reach the two detectors, and values changed during the migration, that is, the values changed as the two photons respectively pass through an object and migrate.

13. The gamma-ray scatter sinogram generation apparatus of claim 12, wherein the emission position is plural, and a plurality of cores of the GPU calculate migration of two photons generated from each of the plurality of emission positions in parallel using the Monte-Carlo simulation, and calculate positions of the two detectors and values changed during the migration in parallel.

14. A sinogram rebinning method comprising:

determining a emission position of a photon in a reconstructed image by a central processing unit (CPU);

generating, by a graphics processing unit (GPU), information on a 3-dimensional (3D) line of response (LoR) connecting positions of two detectors related to a photon pair generated in the emission position using a Monte-Carlo simulation, the positions of the two detectors referring to detector coordinates of when the two photons of the photon pair respectively reach the two detectors; and performing sinogram rebinning based on the information on the 3D LoR, wherein the emission position is plural, the GPU allocates each of the plurality of emission positions to a plurality of threads of the GPU, respectively, and the generating of the information on the 3D LoR and the performing of the sinogram rebinning are performed in parallel respectively by the CPU and the GPU.

15. The sinogram rebinning method of claim 14, wherein the plurality of emission positions are divided into a plurality of groups, and each of the plurality of groups is processed through iterations of the generating of the information of the 3D LoR and the performing of the sinogram rebinning.

16. The sinogram rebinning method of claim 14, wherein the information on the 3D LoR is transmitted from the GPU to the CPU by asynchronous memory transfer.

17. A sinogram emission apparatus comprising:

a central processing unit (CPU) to perform sinogram rebinning based on information on a 3-dimensional (3D) line of response (LoR) that determines an emission position of a photon in a reconstructed image; and a graphics processing unit (GPU) to generate information on the 3D LoR connecting positions of two detectors related to a photon pair generated in the emission position using Monte-Carlo simulation, wherein the positions of the two detectors refers to detector coordinates of when the two photons of the photon pair respectively reach the two detectors, the emission position is plural, the GPU allocates each of the plurality of emission positions to a plurality of threads of the GPU, respectively, and the generating of the information on the 3D LoR and the performing of the sinogram rebinning are performed in parallel respectively by the CPU and the GPU.

* * * * *

UNITED STATES PATENT AND TRADEMARK OFFICE
CERTIFICATE OF CORRECTION

PATENT NO.        : 8,983,162 B2                                     Page 1 of 1
APPLICATION NO.   : 13/467896
DATED             : March 17, 2015
INVENTOR(S)       : Ye et al.

It is certified that error appears in the above-identified patent and that said Letters Patent is hereby corrected as shown below:

Title page, Col. 1, (75), Inventors, line 2, "(JP)" should be --(KR)--.

In the claims

Claim 2, Col. 16, line 53, "LoR and" should be --LoR; and--.

Claim 2, Col. 16, line 56, "plurl" should be --plural--.

Claim 2, Col. 16, line 59, "mi ration of the two hotons" should be --migration of the two photons--.

Claim 2, Col. 16, line 60, "calculatin of the ositions" should be --calculating of the positions--.

Signed and Sealed this
Eighth Day of December, 2015

Michelle K. Lee
*Director of the United States Patent and Trademark Office*